Nov. 21, 1950 C. E. HUFFMAN 2,530,431

COLOR DEVICE FOR UTILIZING CONTROL SIGNALS

Filed Jan. 3, 1946 5 Sheets-Sheet 1

Charles E. Huffman
INVENTOR

BY Charles W. Mortimer

Nov. 21, 1950 C. E. HUFFMAN 2,530,431

COLOR DEVICE FOR UTILIZING CONTROL SIGNALS

Filed Jan. 3, 1946 5 Sheets-Sheet 2

Charles E. Huffman INVENTOR

BY Charles W. Mortimer

Nov. 21, 1950 C. E. HUFFMAN 2,530,431

COLOR DEVICE FOR UTILIZING CONTROL SIGNALS

Filed Jan. 3, 1946 5 Sheets-Sheet 3

Charles E. Huffman INVENTOR

BY Charles W. Mortimer

Charles E. Huffman INVENTOR
BY Charles W. Mortimer

INVENTOR.
CHARLES E. HUFFMAN
BY Darby & Darby
ATTORNEYS

Patented Nov. 21, 1950 2,530,431

UNITED STATES PATENT OFFICE 2,530,431

COLOR DEVICE FOR UTILIZING CONTROL SIGNALS

Charles E. Huffman, Upper Montclair, N. J., assignor to Allen B. Du Mont Laboratories, Inc., Passaic, N. J., a corporation of Delaware Application January 3, 1946, Serial No. 638,799

8 Claims. (Cl. 178—5.4)

This invention relates to means by which signals obtained from a color television image are used to control the scanning path in that image to a predetermined pattern of color lines.

It relates more particularly to color television in which signals are obtained when the scanning path departs from a color line that it should be tracing in the image and contacts with a line of another color. With the present invention these signals are amplified and so controlled that they return the scanning path or spot to the correct line.

Reference is made to my application, Serial No. 638,800, filed of even date herewith entitled "Device for Obtaining Color Controlling Signals for Television," in which the way to obtain such signals is described. In that application means are described for obtaining color control signals which include the following voltages:

Positive voltage when red light is emitted,
Positive voltage when blue light is emitted,
Positive voltage when green light is emitted.
Negative voltage when red light is emitted,
Negative voltage when blue light is emitted, and
Negative voltage when green light is emitted.

By applying one or more of the above voltages to the deflection system of a television cathode-ray tube, the deflection path may be altered to correct for departure from a desired pattern.

Substantial departure of the scanning spot from its predetermined pattern produces a signal which is characteristic of the nature and extent of that departure.

The present invention may be understood from the description in connection with the accompanying drawings in which.

The invention described herein includes amplifiers which select from the voltages produced by departure of the scanning spot from the desired path the one which is of proper polarity to restore the scanning path to the desired pattern.

Each one of the amplifiers described herein embodies a multiple channel input, the separate channels of which are keyed or switched on and off from an inoperative to an operative condition and vice versa in selected groups in conformity with changes in color fields. Each group that is keyed into operation consists of a pair of channels. One channel of the pair passes a positive output associated with one color and the other channel of the pair passes a negative output associated with another color.

Negative outputs associated with one color and positive outputs associated with another color and both positive and negative outputs associated with the third color are not allowed to pass through the amplifiers at that time because the channels associated with these four outputs are kept inoperative during the time when the third color is being scanned.

A sufficient number of stages are provided between the input channels and the integrating circuit to make the polarity and amplitude of the signal from the integrator such that the spot is advanced if it tends to lag and is retarded if it tends to advance from the desired color line, when this signal is fed into the cathode-ray deflection system of the television tube.

The integrating circuit shown herein is adapted to deliver signals to the cathode-ray tube deflection system in which the intelligence derived from part of a line in a control area is extended to affect substantially an entire line or more.

In this way a small part of a line is used to correctly locate the whole line. As described in the application referred to above the control area at the end of the line may be modulated to maximum or a definite light intensity regardless of picture content of that line and provides for maintenance of the line in proper relation whether the picture contains any component of the color being scanned or not.

The control signals that may be obtained, for example, in accordance with my application referred to above are utilized as described below. These signals are applied to the inputs of amplifiers.

Figure 1:
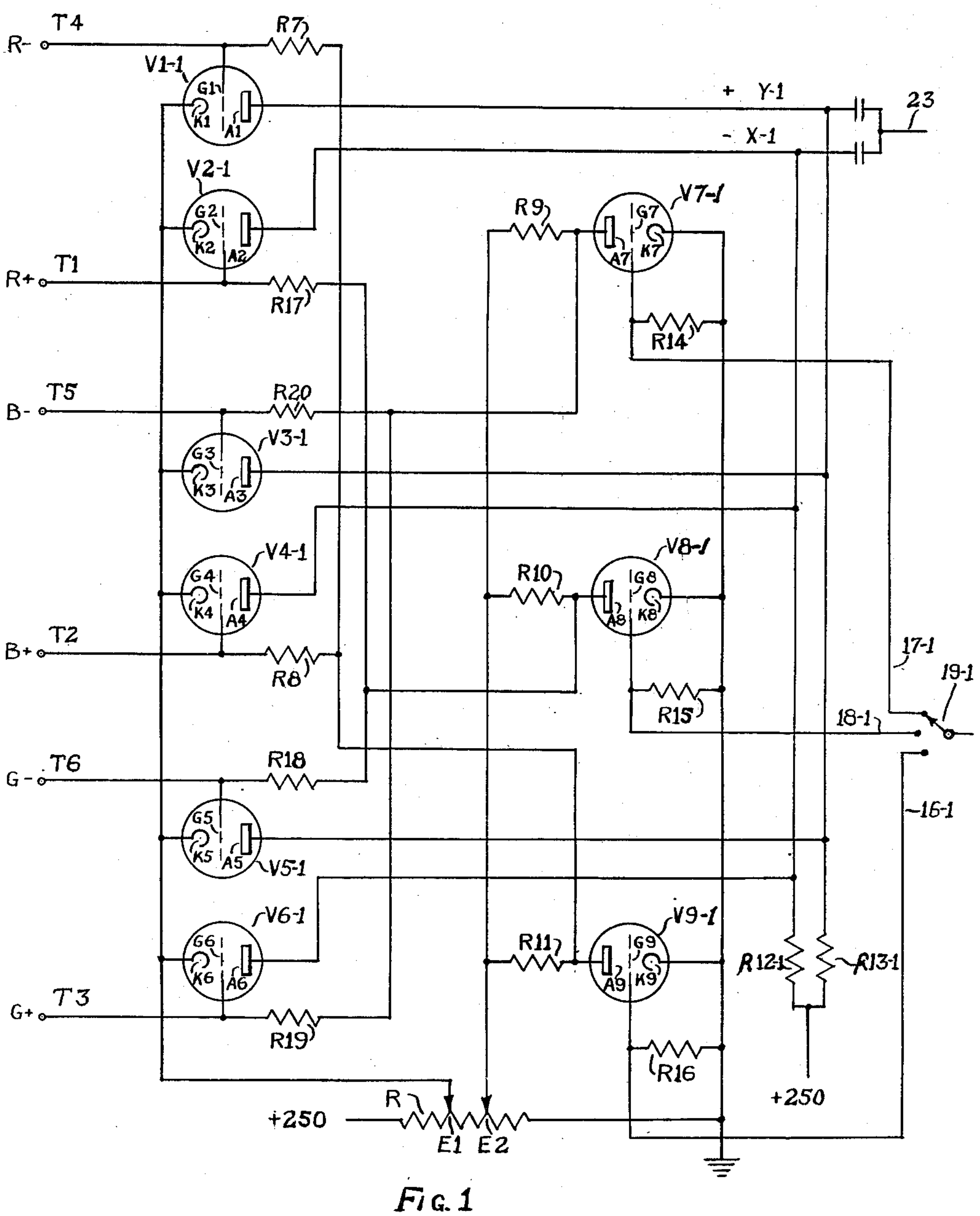
Figs. 1, 2 and 3 are diagrams showing different ways by which parts of a signal obtained as described in said application referred to above are selected and amplified.

In the modification shown in Fig. 1 leads T1 to T6 are provided to conduct signal from like designated output leads shown in my application filed herewith to control grids of tubes V1—1 to V6—1. The plates of tubes V1—1, V3—1 and V5—1 are connected to a 250 volt potential through resistor R13—1 and the plates of tubes V2—1, V4—1, and V6—1 are connected to this source of potential through load resistor R12—1. The cathodes of tubes V1—1 to V6—1 are connected to a positive potential point E1 on resistor R.

The control grids of tubes V1—1 and V4—1 are connected through resistors R7 and R8 to the plate of tube V9—1 which is connected through resistor R11 to a positive potential point E2 on resistor R which is nearer ground potential than point E1 is. The control grids of tubes V2—1 and V5—1 are connected through resistors R17 and R18 to the plate of tube V8—1 which is connected through resistor R10 to point E2, and the control grids of tubes V3—1 and V6—1 are connected through resistors R20 and R19 to the plate of tube V7—1 which is connected through resistor R9 also to point E2. The control grids of tubes V7—1, V8—1 and V9—1 have grid bias resistors R14, R15 and R16.

The operation according to Fig. 1 is as follows:

With the grids G7, G8 and G9 of tubes V7—1, V8—1 and V9—1 connected to the cathodes K7, K8 and K9, respectively, by resistances R14, R15 and R16 and with no external voltage applied to the grids G7, G8 and G9, the tubes V7—1, V8—1, and V9—1 permit current to pass through resistors R9, R10 and R11. The voltage drop across these resistors R9, R10 and R11 is subtracted from the voltage at E2, making anodes A7—1, A8—1 and A9—1 only slightly positive with respect to ground, thus making them negative with respect to the voltage at E2. Grid G1 of tube V1—1 being connected through grid resistor R7, and grid G4 of tube V4—1 through grid resistor R8 to anode A9, are at this time highly negative with respect to the cathodes K1 and K4 which are at E1 potential. This blocks plate current through these tubes V1—1 and V4—1. Similarly, grids G2 and G5 of tubes V2—1 and V5—1 are connected through resistors R17 and R18 to anode A8 and are therefore highly negative with respect to cathode K2 and K5 thus blocking any plate current through these two tubes V2—1 and V5—1. The grids G3 and G6 of tubes V3—1 and V6—1 are connected through resistors R20, and R19 respectively to anode A7 which is likewise highly negative with respect to cathodes K3 and K6 thus blocking any plate current through tubes V3—1 and V6—1. Therefore, the anodes A1, A2, A3, A4, A5 and A6 are at the maximum positive potential 250 volts as there is no voltage drop across resistances R12—1 and R13—1.

For the desired color red, for example, application of a negative voltage between grid G7 and cathode K7 by a color selecting switch such as an electronic switch represented diagrammatically at 19—1, in the known way, current through tube V7—1 and resistance R9 is cut off eliminating voltage drop across R9. Plate A7 is then of the same potential as the point E2 which is negative with respect to point E1 by an amount sufficient to provide normal operating bias between control grids G3 and G6 and the cathodes K3 and K6 of tubes V3—1 and V6—1.

Tubes V3—1 and V6—1 are thus made operative and permit current to flow through resistances R12—1 and R13—1 at a steady rate. The tubes V1—1, V2—1, V4—1 and V5—1 retain high negative bias between their grids and cathodes and are consequently inoperative. This is the condition which maintains the scanning spot within the red lines. Red light as explained in my application filed herewith will result in a negative voltage being applied by lead T4 to grid G1 of tube V1—1, and a positive voltage being applied by lead T1 to grid G2 of tube V2—1. Because tubes V1—1 and V2—1 are inoperative at this time, no plate current will flow through these tubes and the applied voltages do not cause any change in current through resistance R12—1 or R13—1. This condition will be maintained as long as only red light is given off from the scanned pattern that is being controlled. As further described in my application filed herewith, if the scanning spot should depart from its correct trace on a red line, and for instance, illuminate a portion of the green line above this red line this results in a positive signal being delivered by lead T3 to grid G6 of tube V6—1 and a negative signal delivered by lead T6 to grid G5 of tube V5—1. This negative signal on G5 does not affect current through resistance R13—1 because tube V5—1 is at this time inoperative. The positive signal applied by lead T3 to the control grid G6 of tube V6—1 increases the plate current through this tube and through the resistor R12—1, thus increasing the voltage drop across R12—1 and making the lead X—1 less positive or in effect providing negative signal out of the circuit at X—1. This signal is delivered by lead 23 to an integrating circuit whose function and operation is explained below in connection with Fig. 4.

When the spot departs from the red line in the opposite direction and contacts with a blue line, the action is similar. As described in my application filed herewith in such a case a positive voltage is delivered by lead T2 to grid G4 of tube V4—1 which is inoperative and no change in current through R12—1 results. Also in this case a negative voltage is delivered by lead T5 to grid G3 of tube V3—1 which is operative resulting in a decrease in plate current through R13—1 thus decreasing the voltage drop across R13—1 and resulting in a positive signal at Y—1 which is delivered by lead 23 to integrating circuit as described below in connection with Fig. 4.

The operation is similar for the other colors. The controlling potential pulse is applied at grid G7 of tube V7—1 for red lines, at grid G8 of tube V8—1 for blue lines and at grid G9 of tube V9—1 for green lines. Tubes V1—1 and V4—1 are operative for green lines, tubes V2—1 and V5—1 are operative for blue lines and tubes V3—1 and V6—1 are operative for red lines. In each case, a pair of tubes are operative and four inoperative.

Although triodes have been indicated, screen grid tubes may also be used, making them inoperative in the same manner, that is, by controlling the negative bias on their control grids.

Figure 2:
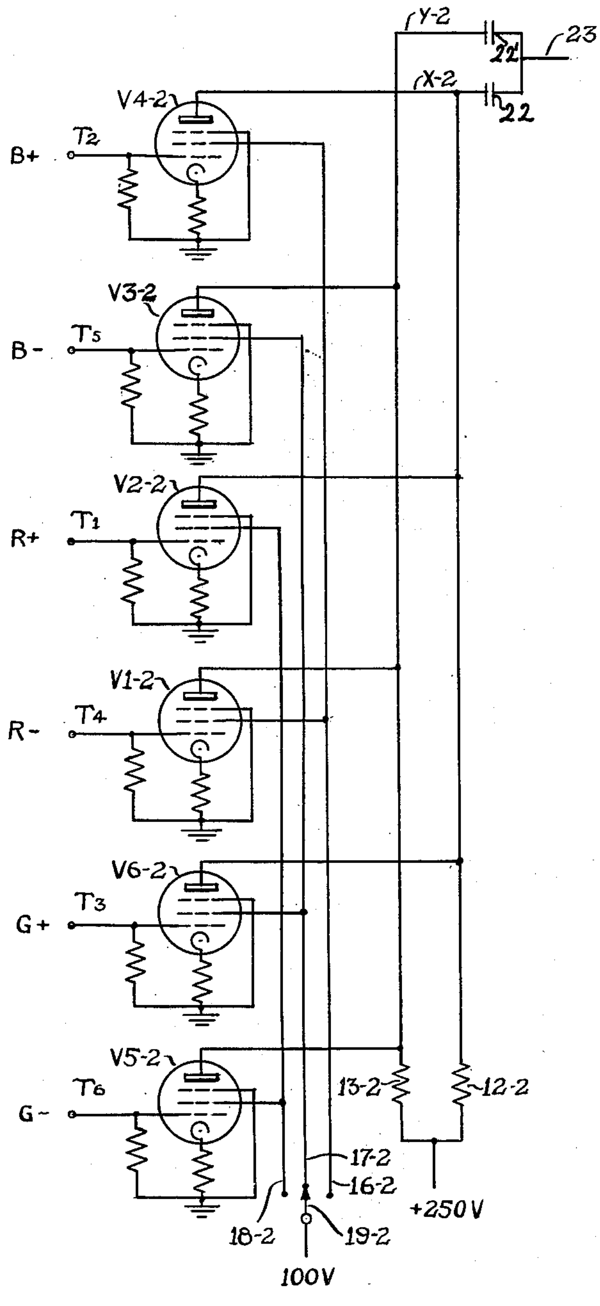

In Fig. 2, control signals obtained as described in my application filed herewith are applied to the control grids of tubes V2—2, V4—2, V6—2, V1—2, V3—2, V5—2 by way of leads T1, T2, T3, T4, T5 and T6.

An electronic switch 19—2 of the known sort, indicated diagrammatically, is adapted to connect a source of potential, which may be 100 volts, to leads 16—2, 17—2, and 18—2, respectively, at predetermined times. Lead 16—2 is connected to the screen grids of the tubes V4—2 and V1—2, lead 17—2 is connected to the screen grids of tubes V3—2 and V6—2 and lead 18—2 is connected to the screen grids of tubes V2—2 and V5—2.

A source of potential which may be 250 volts is connected through the resistance 12—2 to the plates of tubes V2—2, V4—2, and V6—2. This same source of potential is connected through resistor 13—2 to the plates of tubes V1—2, V3—2, and V5—2.

A condenser 22 couples the plates of tubes V2—2, V4—2 and V6—2 to lead 23 and a condenser 22' couples the plates of tubes V1—2, V3—2 and V5—2 to the same lead 23.

The operation, Fig. 2, is similar to that described in relation to Fig. 1 except that the separate input channels are made operative by applying or removing screen voltages to the proper tubes as described below.

For instance where a red line is being scanned the electronic switch 19—2, of the known sort represented diagrammatically, makes connection from a voltage source which may be 100 volts to lead 17—2 which makes the screen grids of tubes V6—2 and V3—2 positive and hence these tubes are operative. Because there is no signal on leads T3 and T5 so long as the scanning remains in the red line no signal is applied to their control grids and no signal appears at lead X—2 or Y—2.

However, when the beam that is intended to scan a red line gets off the same in one direction so that it illuminates part or all of an adjacent green line this will cause a positive signal to be applied by lead T3 to control grid of tube V6—2.

When the beam gets off the red line in the opposite direction and illuminates part or all of the adjacent blue line a negative signal is applied by lead T5 to control grid of tube V3—2.

In the usual manner tubes V6—2 and V3—2 repeat the signals applied to their control grids at their plate circuit with the polarity reversed. Thus the positive signal applied to grid of V6—2 results in a negative signal at X—2. The negative signal applied to grid of V3—2 results in a positive signal at Y—2.

Figure 4:
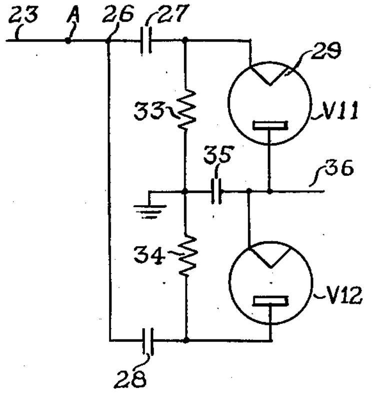
Fig. 4 is a diagram showing a circuit by which the amplified signals are integrated to control the scanning paths.

As described in reference to Fig. 1 these signals at X and Y are combined at 23 and delivered to the integrating circuit of Fig. 4.

Figure 3:
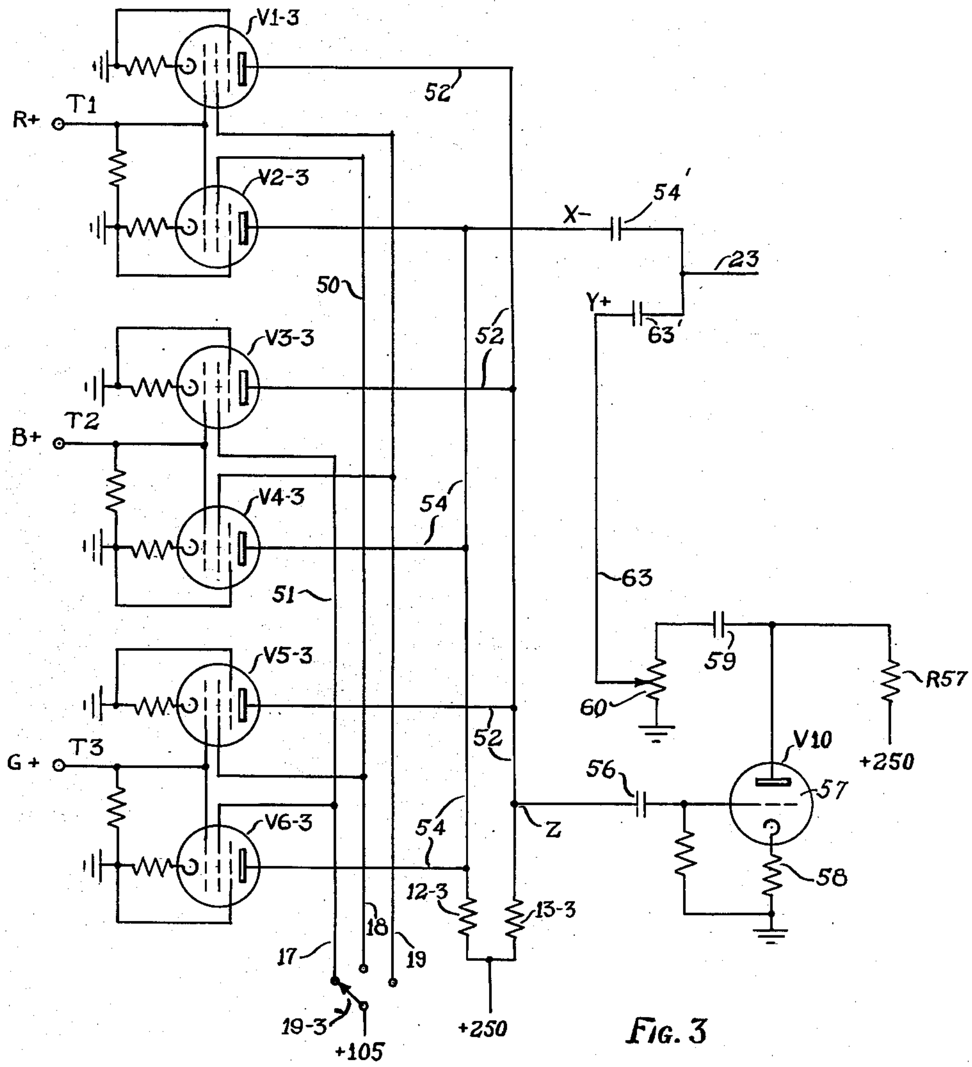

In the operation of Fig. 3 signals, generated as described in my application filed herewith of a single polarity for each color, are utilized to provide control of scanning path in the proper color line.

These signals may be positive for each color, or negative signals for each color or a combination of them.

The following description of Fig. 3 is for the modification in which a positive signal for each color is received at the input leads as follows:

T1 positive voltage when red light is emitted,
T2 positive voltage when blue light is emitted,
T3 positive voltage when green light is emitted.

When the use of negative signals is desired an interchange of plate connection within the pairs V1—3 and V2—3, V3—3 and V4—3, and V5—3 and V6—3 will produce the desired control of scanning path.

In Fig. 3 tubes V1—3 and V2—3 are provided and have their control grids coupled in common to lead T1 which receives a positive signal when a red line is illuminated by scanning spot. Tubes V3—3 and V4—3 have their control grids coupled in common to lead T2 which receives a positive signal when a blue line is illuminated by scanning spot, and tubes V5—3 and V6—3 have their control grids coupled in common to lead T3 which receives a positive signal when a green line is illuminated by scanning spot.

The screen grids of the tubes V1—3 and V4—3 are connected to the lead 19, screen grids of the tubes V2—3 and V5—3 are connected to the lead 18 and the screen grids of tubes V3—3 and V6—3 are connected to the lead 17.

Fig. 3 shows the use of pentodes in which the method of making the proper channels operative or inoperative is the same as that used in Fig. 2, i. e., application or removal of screen voltage by means of electronic switch represented by switch 19—3.

The principle and general operation of the circuit shown in Fig. 3 would be the same if triodes were used and channel selection accomplished by the control grid bias method shown in Fig. 1.

The principle and general operation would also be the same if pentodes were used with their screen voltages fixed and the method of Fig. 1 used to make them operative or inoperative by controlling grid bias.

A combination of the methods of Figs. 1 and 2 in which both control grid bias and screen voltage is controlled may also be used without altering the general principle of circuits shown in Figs. 2 and 3.

The plates of the tubes V1—3, V3—3 and V5—3 are connected by branched leads 52 and load resistor 13—3 to a source of potential which may be 250 volts. The plates of tubes V2—3, V4—3 and V6—3 are connected by branched lead 54 and resistor 12—3 to the same source of potential.

A condenser 56 couples the lead 52 and the plates of tubes V1—3, V3—3 and V5—3 to the control grid of the amplifier V10 that has a plate load resistor R57 connected to a source of positive potential. The plate of the tube V10 is coupled by condenser 59 to voltage divided 60.

A lead 63 couples the adjustable tap on voltage divider 60 through condenser 63' to lead 23 which corresponds to lead 23 in Figs. 1 and 2. Plates of V2—3, V4—3 and V6—3 are connected by lead 54 through condenser 54' to lead 23 also.

The operation according to Fig. 3 is as follows:

For instance when a red line is being scanned the electronic switch 19—3 makes connection from a positive potential which may be 105 volts to lead 17 which makes the screen grids of tubes V3—3 and V6—3 positive. These tubes are thus made operative and they operate when positive signals are applied to their control grids.

Tubes V1—3, V4—3, V2—3 and V5—3 do not have screen voltage and are thus inoperative. This is the same as described in connection with Fig. 2.

If, however, the beam departs from the red line and gets in a direction to illuminate the adjacent green line a positive signal is applied by lead T3 to grids of tubes V5—3 and V6—3. Tube V6—3 being operative as indicated above, this positive signal results in a negative signal at X in the same manner as described in connection with Fig. 2. Tube V5—3 being inoperative as indicated above, the positive signal conveyed also to grid of tube V5—3 by lead T3 does not affect plate current of tube V5—3 and signal on lead T3 does not get through tube V5—3 and consequently tube 57 does not receive a signal. Tube 57 therefore does not deliver any signal to voltage divider 60 and no signal appears at X.

If, however, the beam which is intended to scan a red line gets off its path in the other direction and touches the adjacent blue line, a positive signal is applied by lead T2 to control grids of tubes V3—3 and V4—3. As indicated above tube V4—3 is inoperative and this positive pulse does not cause any change in plate current of tube V4—3 and consequently this positive signal does not result in a signal at X. Tube V3—3 however is operative as indicated above and its plate current is caused to increase. Increase of plate current in tube V3—3 results in a negative signal at Z.

This negative signal which results at Z is caused by a departure of the scanning spot from the desired red line in a direction opposite to that departure which produces a negative signal at X. It is apparent that a positive signal is required at Y to provide correction for this departure in the opposite direction. The signal at Z is therefore delivered through condenser 56 to control grid of tube V10 which results in a decrease in plate current in tube V10 and a lessened voltage drop across resistor R57 providing a positive signal across voltage divider 60 in the usual manner. Condenser 59 serves to block out the D. C. plate voltage from voltage divider 60. The variable contact 63 on voltage divider 60 is adjusted so that the amplitude of positive signal delivered over lead 63 to Y is substantially equal in amplitude to that of negative signal at Z. The result of passing signal through tube V10 and voltage divider 60 is to reverse the polarity of the negative signal at Z and deliver it in suitable positive polarity and amplitude to Y for transmission over lead 23 to the integrating circuit described in connection with Fig. 4.

Fig. 4 shows an integrating circuit which may be used to prolong the effect of the signals generated by a portion of a line, as described in my application filed herewith, over the period of a whole line.

Tubes V11 and V12 are diodes and may be contained in one envelope if desired. Condenser 35 serves as a reservoir in which voltage, passed by the diodes during the time the signal voltage is present, is stored for a longer time.

In the operation of the circuit shown in Fig. 4, lead 26 receives the X and Y signals from lead 23 in Fig. 1, 2 or 3.

The amplitude of the signals on lead 23 in Figs. 1, 2 and 3 may be increased if desired by additional stage or stages of amplification inserted between lead 23 and lead 26′ at some point A.

An even number of stages may be inserted at A to maintain the polarity of signals delivered to lead 26 the same as on lead 23 or an odd number of stages may be inserted at A to reverse polarity of signals if desired.

When a red line is being scanned for instance and the spot remains wholly within that red line no signals will be present on lead 23 as previously described and hence no signals on lead 26.

However should the scanning spot depart from the red line and cause an adjacent green line to be illuminated, a negative signal will appear at X—1 or X—2 or X— in Fig. 1, 2, or 3 and will be impressed by leads 23 and 26 across resistances 33 and 34. Condensers 27 and 28 serve to block out any D. C. voltage which might be present on lead 26 if an intermediate amplifier is used.

A negative signal on lead 26 will produce a negative voltage across resistance 33. This will cause current to flow through tube V11 into condenser 35 because the cathode 29 of tube V11 will be at the negative end of resistor 33. As the spot leaves the control area of the scanning pattern as described in my application filed herewith the signal disappears until the scanning beam traverses the picture area and again enters the control area as previously described.

Due to the unilateral conductivity or rectifying action of diode V11 the charge stored in condenser 35 does not leak off through this diode and condenser 35 tends to remain at the voltage to which it was charged by the signal voltage. Capacity of condenser 35 is large enough so that the voltage to which it is charged during the time that signal is present is small compared to the peak voltage of the signal.

Diode V12 is connected to condenser 35 in reverse direction to diode V11 so that it has its anode connected to ground through resistance 34 which is in a direction suitable for discharging condenser 35. Due however to the non-linearity of the current voltage characteristic of the diodes V11 and V12 at the relatively low voltage stored in condenser 35, diode V12 discharges condenser C35 at a much slower rate than it was charged through diode V11 by the relatively higher peak value of the signal voltage. The voltage stored in condenser 35 is thus retained for the duration of at least one scanning line and in practice actually retains sufficient voltage for the time required to scan several lines.

Should the scanning path be again displaced in the same direction as just described the peak value of the negative signal voltage produced across resistance 33 would again be high with respect to the charged value of condenser 35 and tube V11 would again conduct and increase the voltage to which condenser 35 is charged by an amount substantially equivalent to that produced by the previous signal.

The voltage across condenser 35 is conducted by lead 36 to the deflection circuit of the scanning system and added to the deflection voltage in the known manner.

When the scanning spot is displaced in the opposite direction from its desired path in a red into a blue line, a positive signal produced at Y—2 in Fig. 1, 2 or 3 is delivered by leads 23 and 26 to resistors 33 and 34 as described above. Anode 30 of diode V12 is thus made positive by the signal, which as described above is relatively high in amplitude compared to the voltage stored in condenser C35 by the previous negative signal.

This relatively high voltage allows diode V12 to operate on that portion of its voltage current characteristic where its internal impedance is relatively low, i. e., V12 is then a good conductor and an amount of the charge on condenser 35 substantially equal to that stored by one previous signal pulse in the opposite direction is discharged through V12 and resistance R34 to ground. Thus three positive signal pulses substantially remove the charge stored by three previous negative pulses after which further positive signals will raise the voltage across C35 in steps in a positive direction.

The action is similar for various sequences of signal voltage with the resulting voltage across condenser 35 at any time having polarity similar to the algebraic sum of the previously applied signal voltages, said condenser voltage being altered by each signal voltage as it is received.

The operation of the diodes V11 and V12 and condenser 35 in response to a signal may briefly be summarized as follows:

The first signal charges the storage condenser 35 to a fraction of the peak value of the signal voltage and succeeding signals of like polarity raise the voltage of condenser 35 in successive steps. Stoppage of signals such as will occur when scanning spot remains in its desired line, allows condenser charge to remain substantially constant until further signals are received by the integrating device.

Subsequent signals of opposite polarity will reduce the charge in similar steps, until an equal number of these opposite polarity signals have reduced the charge to zero after which continuing signals of the later polarity will charge condenser 35 in opposite direction.

Figure 5:
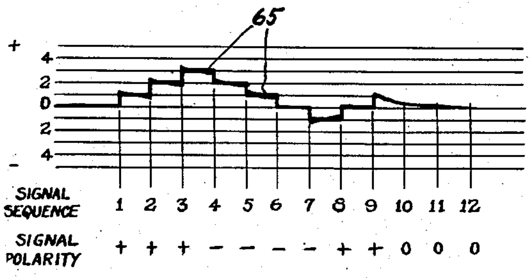
Fig. 5 is a diagram showing how the integrated signal voltage that is obtained varies.

In Fig. 5 line 65 indicates how voltage across the storage condenser 35 varies when for example three positive signals, four negative signals, two positive signals and then no signals are received in that order.

Figure 6:
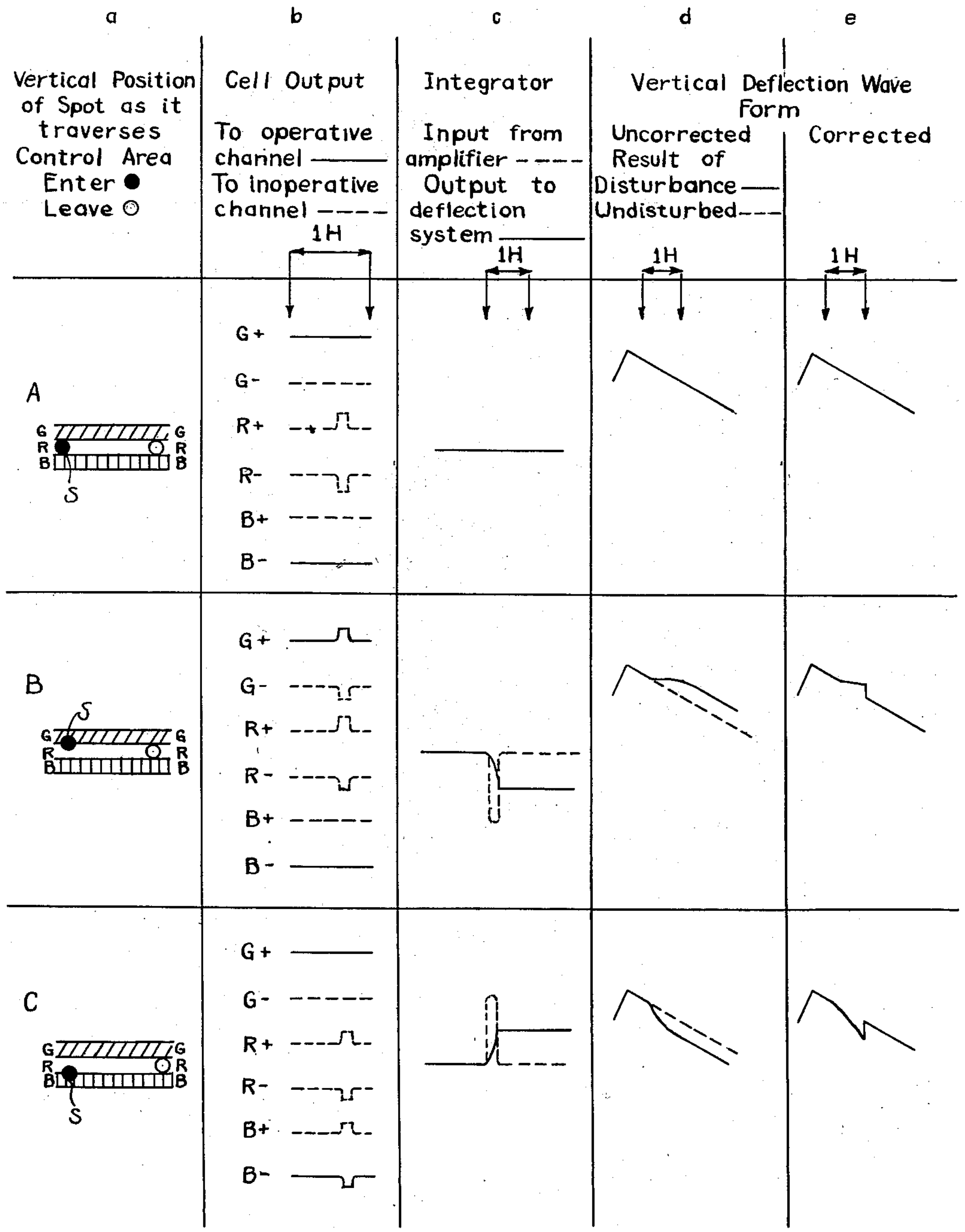
Fig. 6 is a diagram showing the voltage obtained, as described in my application referred to above, and also those selected, amplified, integrated and mixed with deflection voltages of a scanning system.

Fig. 6 is a table showing the form of the signal voltage at different stages in the production and application of control signals which occur for some sample types of departure from desired scanned line and correction thereof.

When the path of the scanning spot S remains within one color, such as red, as shown in column *a*, row A of Fig. 6, a positive signal R+ and a negative signal R— is obtained as shown in column *b*, row A. This is the signal that is obtained when the scanning path does not deviate materially from the desired color line. So long as this condition holds, no correction in the scanning path is required.

When the path of the scanning spot S is disturbed from the desired line as shown in column *a*, row B, the voltages shown in column *b*, row B are obtained. These consist of G positive, G negative, R positive, and R negative.

The electronic switch 19 referred to in Figs. 1, 2 and 3, as was described in connection with those figures serves to make two of the tubes V1 and V6 operative and four inoperative. As indicated at the top of column *b* voltage forms shown in broken line are those applied to non-operative tubes in the groups V1 to V6 in Figs. 1, 2 and 3. As also indicated at the top of column *b* voltage forms shown in solid lines are those applied to operative tubes in the group V1 to V6 in Figs. 1, 2 and 3.

Column *c* as indicated at its top therefore shows by broken line that only amplified replicas of the signal form applied to operative tubes in the groups V1 to V6 of Figs. 1, 2 and 3 are delivered by lead 23 to the integrator circuit of Fig. 4. The solid lines in column *c* as indicated at the top thereof show the output voltage form from the integrator of Fig. 4 produced as a result of only the voltage form shown by solid line in column *b*.

When the path of the scanning spot S is disturbed in the opposite direction as shown in column *a*, row C, blue light emitted from the adjoining blue line will produce a signal B— which is shown in column *b*, row C by a solid line. Signals resulting from the portion of the red line traversed by the scanning spot S are shown at R+ and R— in column *b*, row C by a broken indication that they are applied to inoperative tubes in the groups V1 to V6 in Figs. 1, 2 and 3 so that only voltage form B— in column *b*, row C is applied to integrator shown in Fig. 4 to produce the voltage as shown by solid line in the column *c*, row C which is effective in controlling the scanning path.

Normal scanning voltages produced by the deflection system of a picture tube that go with or produce the scanning paths illustrated in column *a* are shown in the column *d* of Fig. 6. The solid line in column *d*, row A shows the deflection voltage undisturbed and remaining within its desired path, hence requiring no correction. Column *d*, rows B and C show in solid lines the deflection voltage as affected by some disturbance. The dotted portions in column *d* show the desired shape of the deflection voltage as it would have been had it not been disturbed.

Column *e* Fig. 6 shows by solid lines the deflection voltage as corrected by the output voltage of the integrating device.

Figure 7:
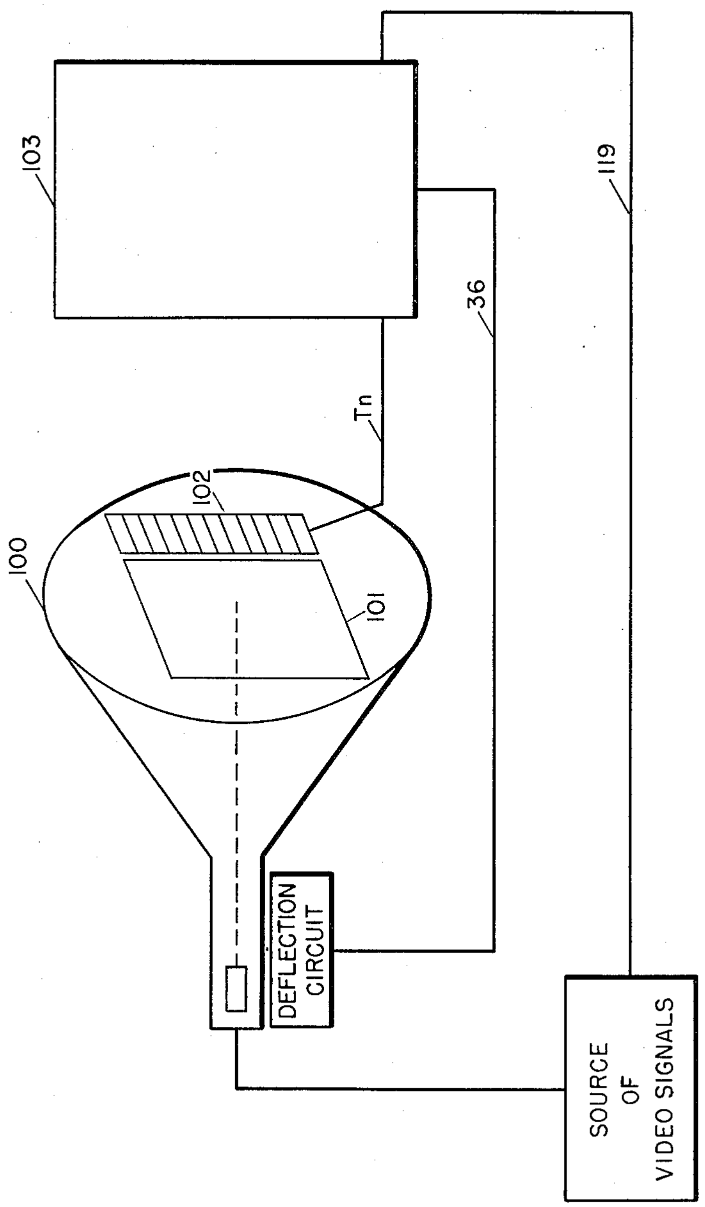
Figure 7 is a diagram in block form showing the complete combination of the cathode ray tube and connections to the circuits shown in Figures 1 to 6.

The complete combination of elements as used in a television system is shown in Figure 7. The cathode ray tube 100 has a picture raster area 101 and a beam controlling area 102 adjacent to the picture raster area 101. The control area 102 is connected by the line T*n* to the circuit shown in block form identified by the numeral 103. T*n* corresponds to T1, T2, etc., shown in Figures 1, 2 and 3. The circuit within the box 103 is the circuit shown in Figures 1 through 4 as discussed above. Lead 36 connected to the deflection circuit for the cathode ray tube corresponds to lead 36 shown in Figure 4. Lead 119 connects the source of video signals to the switching device 19 of Figures 1, 2 and 3 for the operation of such switch, as described above.

While preferred embodiments have been illustrated, modifications will be apparent to those skilled in the art without departing from the scope of the invention.

What is claimed is:

1. In a television system, a cathode ray device containing a light translating area scanned successively by an electron beam in fields composed of a plurality of lines, a source of signals having a character dependent upon the scanning position of said beam, an integrating circuit connected to said source to provide integrated signals therefrom, and a beam positioning circuit connected to said integrating circuit to maintain continuous registry control of said beam in the direction of field scanning.

2. In a television system, a cathode ray device containing a fluorescent raster area and a control area separate from said raster area and adjacent thereto, said areas being scanned in a first direction extending through both areas at television line frequency and in a second direction at television field frequency, a source of signals having a character dependent upon the scanning position of said beam in said second direction in said control area, an integrating circuit connected to said source to provide integrated signals therefrom, and a beam positioning circuit connected to said integrating circuit to receive said integrated signals therefrom and control the position of said beam in said second direction.

3. In a color television system in which a fluorescent raster area in a cathode ray tube emits light in different colors in accordance with the relative position of an electron beam in relation to a plurality of strips extending in a given direction through said fluorescent area, a fluorescent control area separate from said raster area but located adjacent thereto at the extremities of said strips located therein, said control area having a second plurality of strips extending parallel to said first strips, a plurality of photocells located to receive light from said control area and having differing color responses, an integrater circuit connected to receive a signal from said photocells to provide an integrated signal therefrom, and a beam positioning circuit to control said beam in a direction perpendicular to said given direction.

4. In a television system, a cathode ray device containing a light translating area scanned successively by an electron beam in fields composed of a plurality of lines, a source of signals having a character dependent upon the scanning position of said beam, an integrating circuit connected to said source to provide integrated signals therefrom, said integrating circuit having a time constant sufficient to maintain said integrated signals substantially constant during the scanning period of said lines, and a beam positioning circuit connected to said integrating circuit and adapted to maintain continuous registry control of said beam in the direction of field scanning.

5. In a television system, a cathode ray device containing a fluorescent raster area and a control area separate from said raster area and adjacent thereto, said areas being scanned in a first direction in lines extending through both areas and in a second direction in fields, a source of signals having a character dependent upon the position of said beam in said second direction in said control area, an integrating circuit connected to said source to provide integrated signals therefrom, said connection being operative only during the time said beam is scanning said control area, and a beam positioning circuit connected to said integrating circuit to receive said integrated signals therefrom and control the position of said beam in said second direction.

6. In a color television system in which a raster area containing a plurality of parallel light translating strips extending in a first direction is scanned by an electron beam in lines parallel to said first direction and in fields in a second direction perpendicular to said first direction, each of said strips translating one of a plurality of characteristic colors, a plurality of signal sources each responsive to a position of said beam in said second direction corresponding to each of said colors, two signal line channels connected to each of said sources separately controllable by means of color signals, a phase inverter connected in one of said two channels, an integrating circuit connected to all of said channels to provide integrated signals therefrom, and a beam positioning circuit connected to said integrating circuit to maintain continuous registry control of said beam in said second direction.

7. In a color television system in which a raster area containing a plurality of parallel light translating strips extending in a first direction is scanned by an electron beam in lines parallel to said first direction and in fields in a second direction perpendicular to said first direction, each of said strips translating one of a plurality of characteristic colors, a plurality of signal sources each responsive to a position of said beam in said second direction corresponding to each of said colors, a pair of signal line channels connected to each of said sources separately controllable by means of color signals, a plurality of phase inverters, each phase inverter comprising two resistors connected in series respectively with said sources, a neutral connection to the common junction of said resistors, and connections to each of said channels from the ends of said resistors opposite said common junction, a plurality of phase inverters connected respectively in one of each of said pairs of channels and to each of said sources, an integrating circuit connected to all of said channels to provide integrated signals therefrom, and a beam positioning circuit for said beam connected to said integrating circuit to maintain continuous registry control of said beam in said second direction.

8. In a color television system in which a raster area containing a plurality of parallel light translating strips extending in a first direction is scanned by an electron beam in lines parallel to said first direction and in fields in a second direction perpendicular to said first direction, each of said strips translating one of a plurality of characteristic colors, a plurality of sources each responsive to a position of said beam in said second direction corresponding to each of said colors, two channels from each of said sources separately controllable by means of color signals, a phase inverter comprising an electronic tube having an input electrode and an output electrode, said input electrode being connected to one of said two channels from each of said sources, said output electrode being connected to the other of said two channels from each of said sources; an integrating circuit connected to said output electrode to provide integrated signals therefrom, and a positioning control for said beam connected to said integrating circuit and adapted to maintain continuous registry control to said beam in said second direction.

CHARLES E. HUFFMAN.

REFERENCES CITED

The following references are of record in the file of this patent:

UNITED STATES PATENTS

| Number | Name | Date |
|---|---|---|
| 2,251,973 | Beale | Aug. 21, 1941 |
| 2,405,231 | Newhouse | Aug. 6, 1946 |
| 2,415,059 | Zworykin | Jan. 28, 1947 |
| 2,427,523 | Dolberg | Sept. 16, 1947 |

FOREIGN PATENTS

| Number | Country | Date |
|---|---|---|
| 524,443 | Great Britain | Aug. 7, 1940 |